United States Patent
Ballantine et al.

(10) Patent No.: US 12,440,894 B2
(45) Date of Patent: Oct. 14, 2025

(54) POROUS ELECTROLYZER GAS DIFFUSION LAYER AND METHOD OF MAKING THEREOF

(71) Applicant: Ohmium International, Inc., Newark, CA (US)

(72) Inventors: Arne Ballantine, Incline Village, NV (US); Chockkalingam Karuppaiah, Fremont, CA (US); Dien Nguyen, Saratoga, CA (US); James Nguyen, San Jose, CA (US)

(73) Assignee: Ohmium International, Inc., Newark, CA (US)

( * ) Notice: Subject to any disclaimer, the term of this patent is extended or adjusted under 35 U.S.C. 154(b) by 398 days.

(21) Appl. No.: 17/384,033

(22) Filed: Jul. 23, 2021

(65) Prior Publication Data

US 2022/0023946 A1  Jan. 27, 2022

Related U.S. Application Data

(60) Provisional application No. 63/056,820, filed on Jul. 27, 2020.

(51) Int. Cl.
*B22F 5/00* (2006.01)
*B22F 3/11* (2006.01)
(Continued)

(52) U.S. Cl.
CPC ............ *B22F 5/006* (2013.01); *B22F 3/1109* (2013.01); *B22F 3/16* (2013.01); *B22F 3/22* (2013.01); *B22F 3/24* (2013.01); *C25B 1/04* (2013.01); *C25B 9/23* (2021.01); *C25B 9/60* (2021.01); *B22F 2003/242* (2013.01);
(Continued)

(58) Field of Classification Search
CPC .... B22F 7/002; B22F 3/1109; B22F 2302/20; C25B 9/23; C25B 13/04; C25B 13/05; C25B 13/02; C25B 1/04; C25B 11/031; C25B 11/032; C02F 1/46
See application file for complete search history.

(56) References Cited

U.S. PATENT DOCUMENTS

| 4,571,288 A | 2/1986 | Boulton |
| 4,619,753 A | 10/1986 | Christen et al. |

(Continued)

FOREIGN PATENT DOCUMENTS

| AU | 2022287900 | 11/2023 |
| CN | 101796677 | 8/2010 |

(Continued)

OTHER PUBLICATIONS

Chen et al. "Two-phase transport in the cathode gas diffusion layer of PEM fuel cell with a gradient in porosity" International Journal of Hydrogen Energy 33 (2008) 2525-2529 (Year: 2008).*

(Continued)

*Primary Examiner* — Luan V Van
*Assistant Examiner* — Alexander R. Parent
(74) *Attorney, Agent, or Firm* — Polsinelli LLP

(57) ABSTRACT

A porous titanium sheet configured to function as an anode side gas diffusion layer of a proton exchange membrane (PEM) electrolyzer is formed by a powder technique, such as tape casting or powder metallurgy.

22 Claims, 6 Drawing Sheets

(51) Int. Cl.
  *B22F 3/16* (2006.01)
  *B22F 3/22* (2006.01)
  *B22F 3/24* (2006.01)
  *C25B 1/04* (2021.01)
  *C25B 9/23* (2021.01)
  *C25B 9/60* (2021.01)
  *C25B 11/032* (2021.01)

(52) U.S. Cl.
  CPC ..... *B22F 2201/02* (2013.01); *B22F 2301/205* (2013.01); *B22F 2302/20* (2013.01); *B22F 2998/10* (2013.01); *C25B 11/032* (2021.01)

(56) References Cited

U.S. PATENT DOCUMENTS

| | | | |
|---|---|---|---|
| 4,643,818 A | 2/1987 | Seko et al. | |
| 7,871,733 B2 * | 1/2011 | Ikeda | H01M 8/04164 |
| | | | 429/456 |
| 8,669,499 B2 | 3/2014 | Conrad | |
| 9,118,040 B2 | 8/2015 | Smith et al. | |
| 9,325,022 B2 * | 4/2016 | Okuyama | H01M 8/0234 |
| 9,461,311 B2 * | 10/2016 | Lu | H01M 8/0243 |
| 10,287,695 B2 * | 5/2019 | Blanchet | H01M 8/04201 |
| 10,707,494 B2 * | 7/2020 | Kawashima | H01M 4/8626 |
| 11,139,499 B2 * | 10/2021 | Lee | H01M 8/1004 |
| 12,308,484 B2 | 5/2025 | Ballantine et al. | |
| 2001/0021470 A1 | 9/2001 | May et al. | |
| 2004/0081881 A1 | 4/2004 | Vyas et al. | |
| 2004/0161653 A1 | 8/2004 | Andrews et al. | |
| 2004/0241063 A1 | 12/2004 | Appleby et al. | |
| 2006/0234111 A1 | 10/2006 | Gulla et al. | |
| 2008/0166542 A1 * | 7/2008 | Sung | H01M 8/04276 |
| | | | 427/259 |
| 2009/0293262 A1 | 12/2009 | Shimamune | |
| 2010/0015485 A1 | 1/2010 | Conti et al. | |
| 2010/0089746 A1 | 4/2010 | Chang | |
| 2010/0143817 A1 | 6/2010 | Bang et al. | |
| 2010/0273094 A1 | 10/2010 | Li et al. | |
| 2010/0273095 A1 | 10/2010 | Li et al. | |
| 2011/0081591 A1 | 4/2011 | Scherer et al. | |
| 2013/0095251 A1 | 4/2013 | Dadheech et al. | |
| 2013/0175164 A1 | 7/2013 | Smith et al. | |
| 2013/0230793 A1 | 9/2013 | Wang | |
| 2014/0329168 A1 | 11/2014 | Daimler et al. | |
| 2015/0354072 A1 | 12/2015 | Suchsland | |
| 2016/0197388 A1 | 7/2016 | Kogan et al. | |
| 2019/0161868 A1 | 5/2019 | Jang et al. | |
| 2019/0296362 A1 | 9/2019 | Mei et al. | |
| 2019/0393518 A1 | 12/2019 | Volkswagen et al. | |
| 2020/0216968 A1 * | 7/2020 | Hunegnaw | C25B 13/08 |
| 2021/0050603 A1 | 2/2021 | Aperam et al. | |
| 2021/0155491 A1 | 5/2021 | Ballantine et al. | |
| 2021/0156038 A1 | 5/2021 | Ballantine et al. | |
| 2021/0156039 A1 | 5/2021 | Ballantine et al. | |
| 2021/0179451 A1 | 6/2021 | Ballantine et al. | |
| 2021/0179471 A1 | 6/2021 | Ballantine et al. | |
| 2021/0262098 A1 | 8/2021 | Wang | |
| 2022/0049367 A1 | 2/2022 | Ballantine | |
| 2022/0077475 A1 | 3/2022 | Ballantine | |
| 2022/0081780 A1 | 3/2022 | Nakaue et al. | |
| 2022/0396888 A1 | 12/2022 | Karuppaiah | |
| 2023/0231151 A1 | 7/2023 | Wegener | |

FOREIGN PATENT DOCUMENTS

| | | | | |
|---|---|---|---|---|
| CN | 103401003 A | | 11/2013 | |
| CN | 104167560 | | 11/2014 | |
| CN | 107200583 A * | | 9/2017 | ............. B22F 10/43 |
| CN | 108011115 A * | | 5/2018 | ......... H01M 8/0206 |
| CN | 111403767 A | | 7/2020 | |
| CN | 111408725 | | 7/2020 | |
| CN | 111408725 A * | | 7/2020 | ............. B22F 1/107 |
| CN | 112647086 | | 4/2021 | |
| DE | 19647534 A1 * | | 5/1998 | ............. C25B 11/035 |
| DE | 202014008157 U1 | | 1/2016 | |
| EP | 1813688 A1 | | 8/2007 | |
| EP | 3939722 A1 | | 1/2022 | |
| EP | 4189144 A1 | | 6/2023 | |
| EP | 4196627 A1 | | 6/2023 | |
| EP | 4352282 A1 | | 4/2024 | |
| JP | H10251711 A | | 9/1998 | |
| JP | 2000087279 A * | | 3/2000 | ............. C25B 11/03 |
| JP | 2002275676 A | | 9/2002 | |
| JP | 2004068112 A | | 3/2004 | |
| JP | 2004071456 A | | 3/2004 | |
| JP | 2006138005 A | | 6/2006 | |
| JP | 2009102701 A | | 5/2009 | |
| JP | 5040584 | | 10/2012 | |
| JP | 2016081770 A * | | 5/2016 | ............. H01M 4/86 |
| JP | 6388778 | | 9/2018 | |
| JP | 2023535767 A | | 8/2023 | |
| JP | 2023538306 A | | 9/2023 | |
| JP | 2024521299 A | | 5/2024 | |
| TW | 2020-08636 | | 2/2020 | |
| TW | 202214913 | | 4/2022 | |
| TW | 202225488 A | | 7/2022 | |
| TW | 202314044 A | | 4/2023 | |
| WO | 2018236649 A1 | | 12/2018 | |
| WO | WO 2018/224448 | | 12/2018 | |
| WO | WO 2022/026332 | | 2/2022 | |
| WO | WO 2022/036311 | | 2/2022 | |
| WO | WO 2022/260983 | | 12/2022 | |

OTHER PUBLICATIONS

Lettenmeir et al. "Towards developing a backing layer for proton exchange membrane electrolyzers" Journal of Power Sources 311 (2016) 153-158 (Year: 2016).*

Lettenmeier et al. "Comprehensive investigation of novel pore-graded gas diffusion layers for high-performance and cost-effective proton exchange membrane electrolyzers" Energy Environ. Sci., 2017, 10, 2521 (Year: 2017).*

Xing et al. "Homogenization of current density of PEM fuel cells by in-plane graded distributions of platinum loading and GDL porosity" Chemical Engineering Science 192 (2018) 699-713 (Year: 2018).*

U.S. Appl. No. 17/402,821 Office Action dated Dec. 7, 2023.

Ijaodola et al., "Evaluating the Effect of Metal Bipolar Plate Coating on the Performance of Proton Exchange Membrane Fuel Cells" energies, vol. 11 (Nov. 18, 2018): pp. 1-28; p. 8-p. 13.

PCT Application No. PCT/US2022/032316 International Search Report and Written Opinion dated Aug. 26, 2022.

Bensebaa, F., "Nanoparticle Assembling and System Integration," Interface Science and Technology, Chapter 4, vol. 19, pp. 185-277, (2013); DOI:10.1016/B978-0-12-369550-5.00004-5.

Bolton, J.D. et al., "Silicide Phase Formation and Its Influence on Liquid Phase Sintering in 316L Stainless Steel with Elemental Silicon Additions," Powder Metallurgy, vol. 41, No. 2, pp. 93-101, (1998); DOI: 10.1179/pom.1998.41.2.93 https://www.tandfonline.com/doi/abs/10.1179/pom.1998.41.2.93.

Mo, J. et al., "Investigation of titanium felt transport parameters for energy storage and hydrogen/oxygen production", In: AIAA Propulsion and Energy Forum, 13th International Energy Conversion Engineering Conference, 2015, AIAA paper 2015-3914, pp. 1-9.

Shbeh, M. M. et al., "Open celled porous titanium", Advanced engineering materials, 2017, vol. 19, No. 11, oo, 1600664(2)-1600664(17).

PCT Application No. PCT/US2021/043047 International Preliminary Report on Patentability dated Jan. 31, 2023.

PCT Application No. PCT/US2021/043047 International Search Report and Written Opinion dated Nov. 12, 2021.

PCT Application No. PCT/US2021/046113 International Search Report and Written Opinion dated Dec. 6, 2021.

AZO Materials, "Powder Metallurgy—Component Manufacture by Uniaxial Pressing, " https://www.azom.com/article.aspx?ArticleID=155, visited Jul. 23, 2021.

Chisholm, G. et al. "3D printed flow plates for the electrolysis of water: An economic and adaptable approach to device manufacture" Energy Environ. Sci., 2014, 7, 3026-3032; https://doi.org/10.1039/C4EE01426J.

(56) References Cited

OTHER PUBLICATIONS

Wikipedia, "Tape Casting," https://en.wikipedia.org/wiki/Tape_casting, visited Jul. 23, 2021.
U.S. Appl. No. 17/402,821 Final Office Action dated Jul. 16, 2024.
PCT Application No. PCT/US2022/032316 International Preliminary Report on Patentability dated Dec. 21, 2023.
U.S. Appl. No. 17/466,766 Office Action dated Oct. 21, 2024.
EP Application No. 21851336.4 Extended Search Report dated Sep. 13, 2024.
Hackemüller, F. J. et al., "Manufacturing of Large-Scale Titanium-Based Porous Transport Layers for Polymer Electrolyte Membrane Electrolysis by Tape Casting," Advanced Engineering Materials, 2019, 10 pages.
Schuler, T. et al., "Hierarchically Structured Porous Transport Layers for Polymer Electrolyte Water Electrolysis," Advanced Energy Materials, 2020, 12 pages.
PCT Application No. PCT/US2021/046113, International Preliminary Report on Patentability dated Feb. 23, 2023.
U.S. Appl. No. 17/833,018, Final Office Action dated Mar. 19, 2025.
U.S. Appl. No. 17/833,018, Office Action dated Sep. 26, 2024.
TW Application No. 110130178, Office Action dated Jan. 20, 2025.
TW Application No. 110127202, Office Action dated Apr. 4, 2025.
EP Application No. 21856852.5, Supplementary Partial European Search Report dated May 9, 2025.
Feng, et al., "A review of proton exchange membrane water electrolysis on degradation mechanisms and mitigation strategies", Journal of Power Sources 366:33-55, 2017.
EP Application No. 22820828.6, Extended European Search Report dated Jul. 4, 2025.
JP Application No. 2023-505401, Notice of Reasons for Rejection dated Jul. 29, 2025.

\* cited by examiner

POROUS ELECTROLYZER GAS DIFFUSION LAYER AND METHOD OF MAKING THEREOF

CROSS REFERENCE TO RELATED APPLICATIONS

This application claims priority to U.S. Provisional Application No. 63/056,820, filed Jul. 27, 2020, the entire contents of which are incorporated by reference herein.

FIELD

The present disclosure is directed to electrolyzers in general and to a gas diffusion layer for an electrolyzer and method of making thereof in particular.

BACKGROUND

Proton exchange membrane (PEM) electrolyzers may be used to convert water into separate hydrogen and oxygen streams. Such PEM electrolyzers include a polymer electrolyte located between an anode electrode and a cathode electrode. Anode side and cathode side porous gas diffusion layers are located adjacent to the respective anode and cathode electrodes.

SUMMARY

In one embodiment, a porous titanium sheet configured to function as an anode side gas diffusion layer of a proton exchange membrane (PEM) electrolyzer is formed by a powder technique.

In one embodiment, a method comprises making a porous titanium sheet configured to function as an anode side gas diffusion layer of a proton exchange membrane (PEM) electrolyzer by a powder technique.

FIGURES

DETAILED DESCRIPTION

Figure 1:
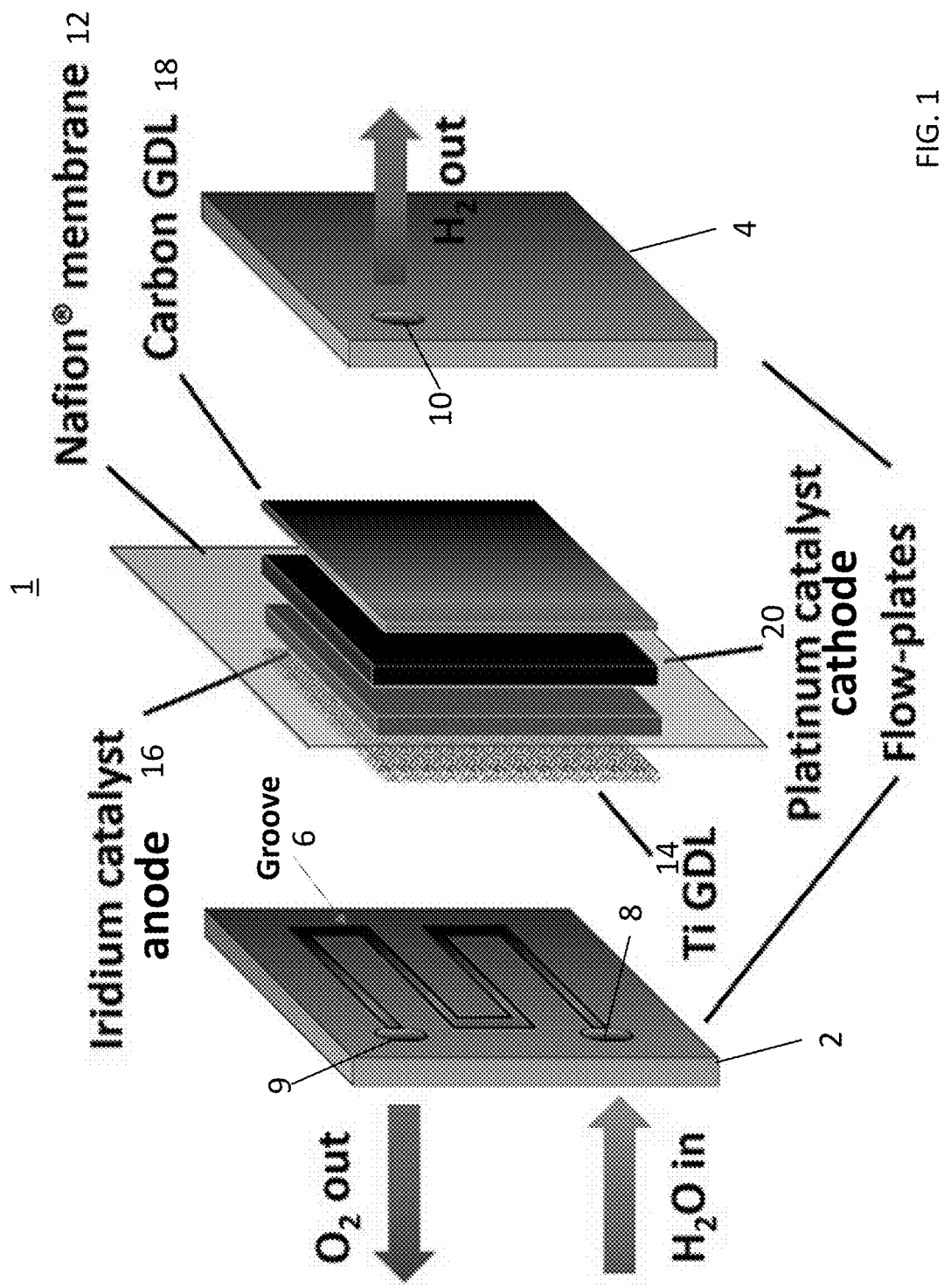
FIG. 1 is a perspective cut-away view of a PEM electrolyzer.

FIG. 1 illustrates a perspective cut-away view of a PEM electrolyzer that is described in an article by Greig Chisholm et al. "3D printed flow plates for the electrolysis of water: An economic and adaptable approach to device manufacture" Energy Environ. Sci., 2014, 7, 3026-3032. The PEM electrolyzer 1 includes an anode side flow plate 2 and cathode side flow plate 4 with fluid flow channels 6 and respective openings 8, 9, 10, a PEM polymer electrolyte 12 located between the flow plates 2, 4, an anode side gas diffusion layer 14 located between the electrolyte 12 and the anode side flow plate 2, an anode electrode 16 located between the anode side gas diffusion layer 14 and the electrolyte 12, a cathode side gas diffusion layer 18 located between the electrolyte 12 and the cathode side flow plate 4, and a cathode electrode 20 located between the cathode side gas diffusion layer 18 and the electrolyte 12.

The anode side flow plate 2 may include a water inlet opening 8, an oxygen outlet opening 9 and a water flow channel (e.g. tortuous path groove) 6 connecting the water inlet opening 8 and the oxygen outlet opening 9 in the side of the flow plate 2 facing the anode side gas diffusion layer 14. The anode side gas diffusion layer 14 may comprise a porous titanium layer. The cathode side gas diffusion layer 18 may comprise a porous carbon layer. The anode electrode 16 may comprise any suitable anode catalyst, such as an iridium layer. The cathode electrode 20 may comprise any suitable cathode catalyst, such as a platinum layer. Other noble metal catalyst layers may also be used for the anode and/or cathode electrodes. The electrolyte 12 may comprise any suitable proton exchange (e.g., hydrogen ion transport) polymer membrane, such as a Nafion® membrane composed of sulfonated tetrafluoroethylene based fluoropolymer-copolymer having a formula $C_7HF_{13}O_5S \cdot C_2F_4$.

In operation, water is provided into the water flow channel 6 through the water inlet opening 8. The water flows through the water flow channel 6 and through the anode side gas diffusion layer 14 to the anode electrode 16. The water is electrochemically separated into oxygen and hydrogen at the anode electrode 16 upon an application of an external current or voltage between the anode electrode 16 and the cathode electrode 20. The oxygen diffuses back through the anode side gas diffusion layer 14 to the anode side flow plate 2 and exits the electrolyzer 1 through the oxygen outlet opening 9. The hydrogen ions diffuse through the electrolyte 12 to the cathode electrode 20 and then exit the electrolyzer 1 through the cathode side gas diffusion layer 18 and the hydrogen outlet opening 10 in the cathode side flow plate 4.

A porous titanium layer (e.g., sheet) may be used as the anode side gas diffusion layer (i.e., transport layer) 14. In one embodiment, the porous titanium layer (e.g., sheet) that is used as an anode side gas diffusion layer 14 is formed by a powder process.

In one embodiment, the powder process comprises tape casting. After the porous titanium sheet is sintered, it may be coated on both sides (e.g., on the anode electrode side and the flow plate side) with a conductivity enhancing and/or corrosion resistant coating, such as a platinum and/or gold coating to provide good conductivity and corrosion resistance. The coating may be formed by physical vapor deposition, such as evaporation.

In another embodiment, the porous titanium layer (e.g., sheet) that is used as an anode side gas diffusion layer 14 is formed by a powder metallurgical technique, in which a titanium powder is pressed into a porous titanium sheet using compaction process. The compacted sheet is then sintered to yield a gas diffusion layer (e.g., sheet) with an established metallurgical bond. The porous titanium sheet may have a porosity between 40 and 60 percent.

FIGS. 2A to 2F show exemplary steps in a powder metallurgy technique (e.g., a technique illustrated on azom.com that may be used to form the porous anode side titanium gas diffusion layer. The powder metallurgy press apparatus 100 includes a chamber 101 containing an upper punch 102 and a lower punch 104 that move axially relative to a die cavity 106 located in a die 108.

Figure 2:
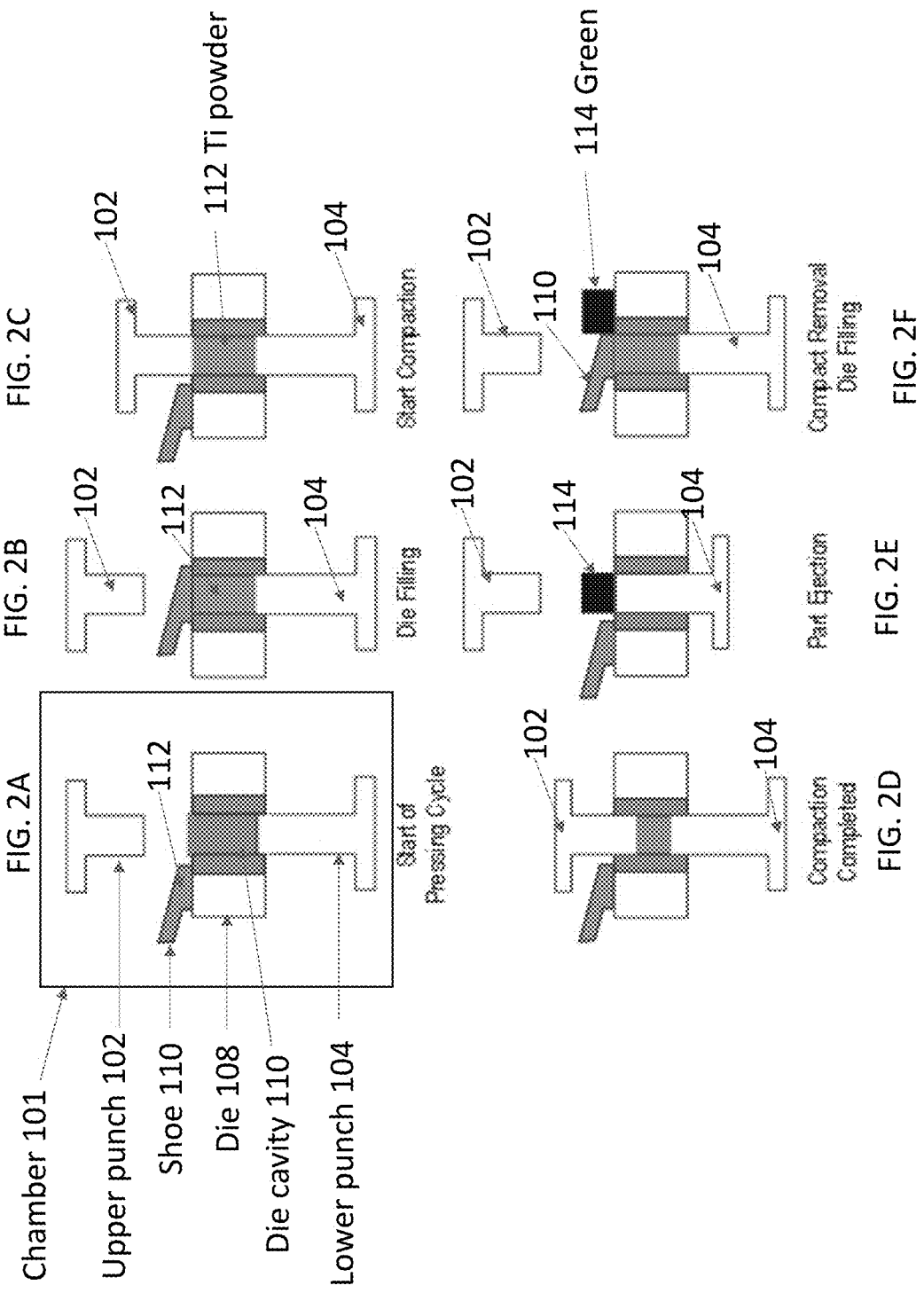
FIGS. 2A-2F are side cross sectional views of steps in a powder metallurgy method of making a gas diffusion layer for a PEM electrolyzer.

The steps in the powder metallurgy compaction cycle include lowering the lower punch 104 from the elevated position to expose the die cavity 106, as shown in FIGS. 2A and 2B. The titanium powder 112 is mixed with a lubricant and then provided into a powder shoe 110. The powder shoe 110 containing the titanium powder 112 mixed with the lubricant moves over the die cavity to fill the die cavity with a mixture of titanium powder 112 and lubricant. After the shoe 110 is withdrawn, the top and/or bottom punches 102, 104 move relative to the die 108 to compress the titanium powder 112, as shown in FIGS. 2C and 2D. After compaction the top punch 102 is retracted upwards and the bottom punch 104 moves relative to the die 108 to eject the compacted green titanium sheet 114 from the die cavity 106, as shown in FIG. 2E. The shoe 110 then again moves across the top surface of the die 108 where it refills the die cavity with additional titanium powder 112 and lubricant mixture and pushes the green titanium sheet 114 out of the die 108, as shown in FIG. 2F.

The green titanium sheet 114 may be provided onto a moving belt which moves the green titanium sheet through one or more belt furnaces. The sheet may first be annealed at a lower temperature in a de-binding process to burn out the organic lubricant (i.e., binder), followed by annealing at a high temperature to sinter the de-lubricated titanium sheet. The sintered porous titanium sheet 14 is then provided into the electrolyzer (e.g., the electrolyzer 1 of FIG. 1) between the anode side flow plate 2 and the membrane-electrode assembly (i.e., the electrolyte 12 with anode electrode 16 and cathode electrode 20 located on opposite sides thereof) to function as the anode side gas diffusion layer 14.

Figure 3:
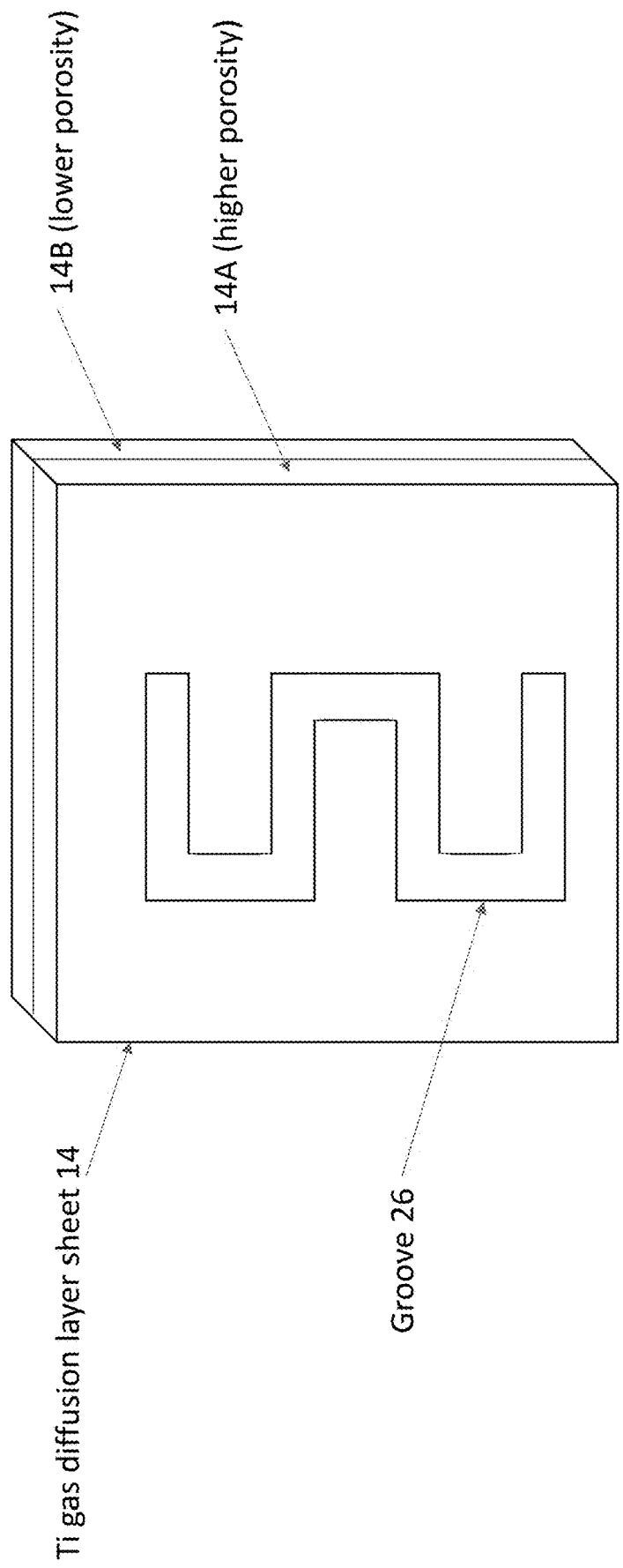
FIG. 3 is a perspective view of a gas diffusion layer according to an embodiment of the present disclosure.

In one embodiment shown in FIG. 3, a first major side 14A of the porous titanium sheet 14 has a higher porosity than an opposite second major side 14B of the porous titanium sheet 14. The first major side 14A of the porous titanium sheet 14 faces the anode side flow plate 2, and the opposite second major side 14B of the porous titanium sheet 14 faces the anode electrode 16. For example, the first major side 14A of the porous titanium 14 sheet may have the porosity which is at least 10 percent higher than the opposite second major side 14B of the porous titanium sheet 14. The first major side 14A of the porous titanium sheet may have a porosity of 40 to 50%, while the opposite second major side 14B of the porous titanium sheet may have a porosity of 50 to 60%. In one embodiment, the higher porosity on the flow plate 2 side 14A of the porous titanium sheet 14 permits more water to enter the pores, while the lower porosity on the anode electrode 16 side 14B of the titanium sheet 14 provides an improved electrical contact with the anode electrode 16.

The porosity difference may be a continuous porosity gradient in which the porosity increases continuously from the first major side 14A to the second major side 14B (i.e. between opposing major surfaces). Alternatively, the porosity may change in a stepwise fashion such that the porous titanium sheet 14 has at least first and second portions (14A, 14B) having different respective porosities from each other. To form different porosity regions, a different amount of lubricant is added to top and bottom sections of the titanium powder 112 in the die cavity 106 in a continuous gradient or in a stepwise manner. The porous titanium sheet 14 has a higher porosity in a portion 14A that is made from a powder section containing a higher lubricant concentration than in a portion 14B that is made from a powder section containing a lower lubricant concentration. The different lubricant concentration in the die cavity 106 may be formed by two or more different passes of the shoe 110 in which the titanium powder 112 to lubricant ratio is different (e.g., higher or lower) in different passes. The die cavity 106 is partially filled during the first shoe 110 pass with a first portion of the mixture of the titanium powder 112 and lubricant having a first titanium powder to lubricant ratio, and the die cavity 106 is additionally filled during the second shoe 110 pass with a second portion of the mixture of the titanium powder 112 and lubricant having a second titanium powder to lubricant ratio different from the first ratio. The lower titanium powder 112 to lubricant ratio results in a higher porosity during the de-binding anneal step.

In another embodiment, a first major surface of the anode side flow plate which faces the anode side gas diffusion layer 14 contains a water flow channel groove 6, as shown in FIG. 1. The first major side 14A of the porous titanium sheet 14 which faces the anode side flow plate 2 includes a groove 26 which is a substantial mirror image of the water flow channel groove 6, as shown in FIG. 3. As used herein, a substantial mirror image of the water flow channel groove 26 means a shape which is a general mirror image of the water flow channel groove 6, but which may have dimensions which differ by less than 20%. In contrast, an opposite second major side 14B of the porous titanium sheet 14 which faces the anode electrode 16 has a substantially planar surface which lacks a groove 26. Such design facilitates water flow on the flow plate 2 side 14A of the gas diffusion later 14, while maintaining a good electrical contact between the gas diffusion layer 14 and the anode electrode 16. The groove 26 in the porous titanium sheet 14 may be formed by using the upper punch 102 or the lower punch 104 in the apparatus of FIG. 2A which contains a protrusion which is a mirror image of the groove 26.

Figure 4:
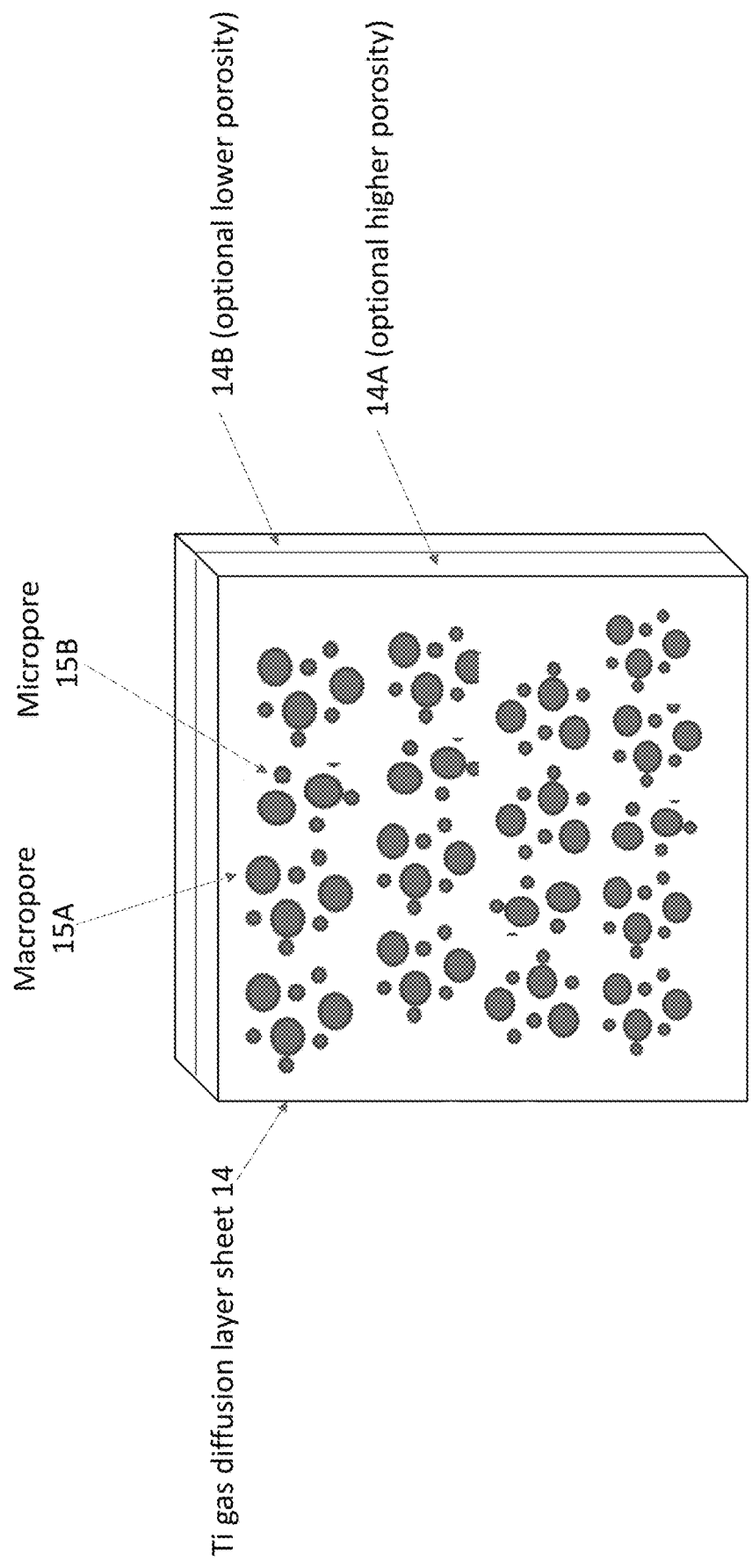
FIGS. 4 and 5 are another perspective views of a gas diffusion layer according to embodiments of the present disclosure.

In another embodiment shown in FIG. 4, the porous titanium sheet 14 has a bimodal distribution of pore sizes as part of the porosity network. The two modes of the pore sizes are broadly classified as micropores 15B and macropores 15A which are larger than the micropores 15B. Micropores 15B act as capillary tubes and help transport water from the groove 6 to the anode electrode (e.g., anode catalyst layer) 16, while the macropores 15A provide low flow resistive path for generated gas to leave electrocatalyst to the grove 6 to be transported by the flowing water. Pore sizes may be calculated using Young Laplace equation. In one embodiment, the micropore 15B average pore size is in the range of 1 to 5 microns and the macropore 15A average pore size is in the range of 30 to 40 microns.

In another embodiment, the porous titanium sheet 14 formation in the powder press apparatus 100 of FIGS. 2A-2F is carried out in an inert, low oxygen partial pressure atmosphere in the chamber 101 so that titanium is not oxidized to titanium dioxide to reduce resistive losses and avoid a fire due to titanium oxidation. The inert atmosphere may comprise any suitable inert gas, such as a noble gas, such as argon. The atmosphere may comprise an oxygen partial pressure of less than 0.1 atm, such as 0.0001 to 0.01 atm. The inert gas may be provided into the chamber 101 containing the die 108 and the punches 102, 104. Alternatively the inert gas may be provided into the die cavity as a gas blanket from an inert gas conduit after filling the die cavity with the titanium powder.

In another embodiment, the porous titanium sheet 14 formation in the powder press apparatus 100 of FIGS. 2A-2F is carried out with titanium alloy powders. Titanium may be alloyed with any one or more of molybdenum, vanadium, niobium, tantalum, and/or zirconium. Thus, a titanium alloy powder containing more than 50 atomic percent titanium (e.g., 60 to 99 atomic percent Ti and less than 50 atomic percent, such as 1 to 40 atomic percent molybdenum, vanadium, niobium, tantalum, and/or zirconium) may be used in the powder press apparatus. The powder particles comprise the titanium alloy particles. Alternatively, a combination (e.g., mixture) of two powders may be used in the powder press apparatus: a titanium containing powder, such as a pure titanium powder, and an alloying element powder containing molybdenum, vanadium, niobium, tantalum, and/or zirconium. The combination of the powders contains more than 50 atomic percent titanium powder particles (e.g., 60 to 99 atomic percent Ti) and less than 50 atomic percent, such as 1 to 40 atomic percent of the alloying element powder particles. The porous titanium alloy sheet is formed during compaction in the powder press apparatus. The combination of chemical stability requirements and the processability requirements may be used to select the grade of titanium alloy. The alloy grades can be Grades 1, 2, 3, 6, 7, 9, 11, 16, 17, 18, 21, 24, 26, 27, 29, 32, 36 and/or 37.

In another embodiment, a noble metal coating (e.g., gold or platinum group metal coating) may be formed on the porous titanium sheet 14 during the powder metallurgy process, which increases the coating process speed and reduces the coating process cost. In this embodiment, a noble metal powder is provided into the die cavity 106 below and above the titanium powder 112, following by compressing all powders together using the punches 102, 104, as shown in FIGS. 2A-2F. The different powder layers may be formed by three or more different passes of the shoe 110 in which the powder composition varies in different passes. The die cavity 106 is partially filled during the first shoe pass with a noble metal powder and lubricant mixture, then the die cavity is additionally filled with a titanium powder 112 and lubricant mixture during the second shoe pass, and finally the die cavity is filled with a noble metal powder and lubricant mixture during the third shoe pass. In one embodiment, two different shoes 110 filled with different powder may be used. A first shoe filled with the noble metal powder and lubricant mixture is used during the first and the third shoe passes. A different second shoe filled with the titanium powder and lubricant mixture is used during the second shoe pass. This forms a noble metal/titanium/noble metal powder tri-layer in the die cavity. The tri-layer is then compressed to form a porous titanium plate coated on both major surfaces by a noble metal.

Figure 5:
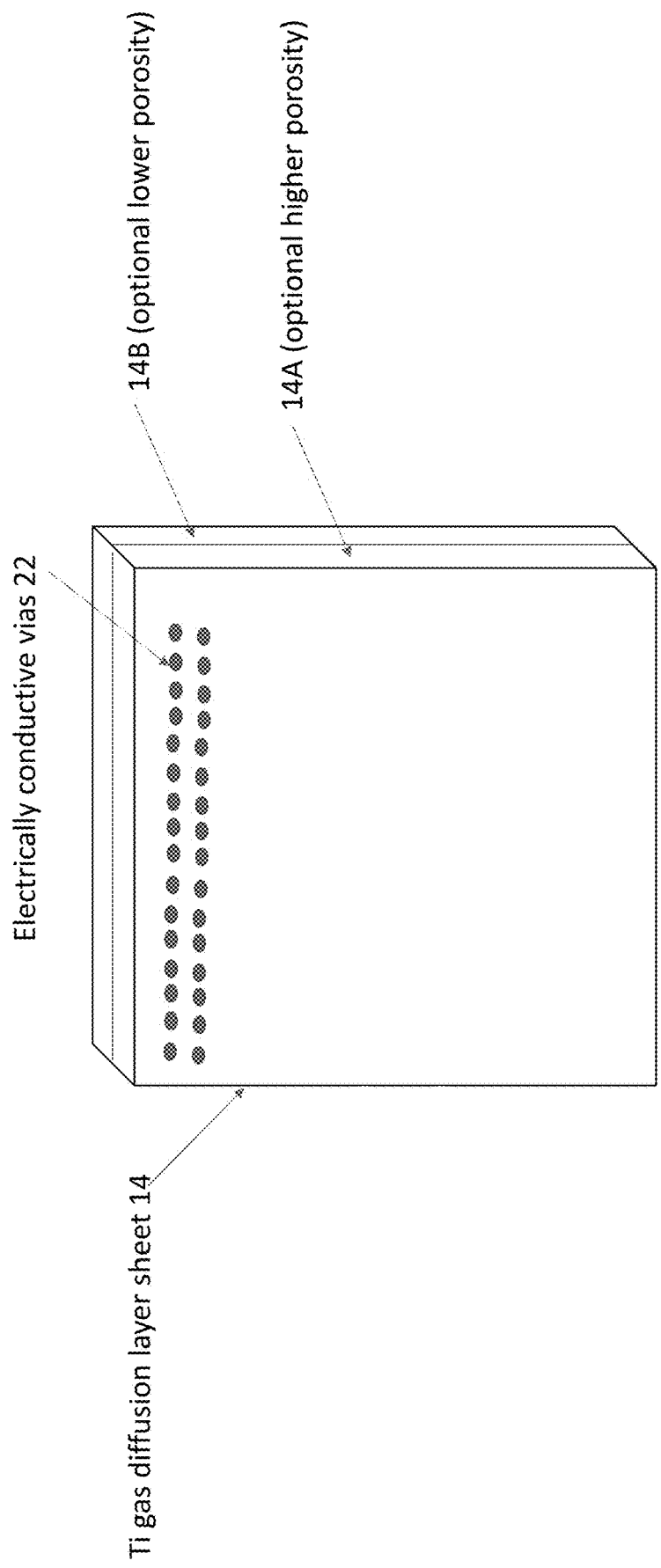

In another embodiment shown in FIG. 5, the porous titanium sheet has inherent vias that are filled in with one or more noble metal powder to create highly conductive vias 22. In other words, the porous titanium or titanium alloy sheet 14 includes noble metal vias 22 extending through the thickness direction of the sheet 14. The noble metal vias 22 may include any suitable noble metal, such ruthenium, rhodium, palladium, silver, osmium, iridium, platinum, and/or gold. The vias provide good electrical conductivity, thus separating the function of electrical conductivity from the water/gas transport function provided by the chemically stable porous sheets 14.

In another embodiment, the de-binding and sintering protocol is selected to obtain a continuous noble metal coating on opposite major surfaces of the porous titanium layer 14, while increasing the porosity of the porous titanium sheet. This may be accomplished by using a higher de-binding temperature ramp rate and/or a lower sintering temperature. In one embodiment, the relatively high de-binding ramp rate may be from 1° C./min to 5° C./min, for example, from 2° C./min to 4° C./min. In one embodiment, the relatively low sintering temperature may be from 1100° C. to 1300° C., such as from 1150° C. to 1250° C.

In another embodiment, the method of forming the anode side gas diffusion layer 14 includes control of silicide formation. For example, some metal alloys form silicide phases during sintering (see J. D. Bolton, M. Youseffi & B. S. Becker (1998) Silicide Phase Formation and Its Influence on Liquid Phase Sintering in 316L Stainless Steel with Elemental Silicon Additions, Powder Metallurgy 41:2, (1998) 93-101, incorporated herein by reference in its entirety). Specifically, silicon addition to 316L stainless steel causes liquid silicide phase formation during sintering, which leave large pores in the stainless steel parts after sintering is completed.

In one aspect of the present embodiment, silicide formation control includes using titanium powder 112 with less than 0.1 weight percent silicon (e.g., 0 to 0.01 weight percent silicon) in the powder metallurgy process used to form the anode side gas diffusion layer. The total or substantial absence of silicon in the titanium powder avoids or reduces formation of titanium silicide phase or phases on the surface of the anode side gas diffusion layer, which may provide undesirable surface properties for the anode side gas diffusion layer.

In another aspect, silicide formation control includes using titanium powder 112 with at least 1 weight percent silicon (e.g., 1 to 10 weight percent silicon) dispersed throughout the entire die cavity in the powder metallurgy process used to form the anode side gas diffusion layer 14. In this embodiment, the titanium silicide phase forms throughout the entire thickness of the anode side gas diffusion layer during sintering (e.g., liquid phase sintering), and acts as a pore former. Thus, the porosity of the anode side gas diffusion layer 14 is increased by intentionally generating silicide phase pore former during sintering, which leaves pores in the anode side gas diffusion layer. Furthermore, since the silicide phase is distributed throughout the anode side gas diffusion layer 14, the silicide phase is not concentrated on the surface of the anode side gas diffusion layer, and undesirable surface effects are avoided or reduced.

Thus, the powder metallurgical method of making a porous titanium sheet configured to function as an anode side gas diffusion layer of a proton exchange membrane (PEM) electrolyzer includes providing a mixture of titanium powder and lubricant into a die cavity, compressing the mixture of titanium powder and lubricant in the die cavity to form a green sheet, de-binding the green sheet, and sintering the green sheet to form the porous titanium sheet.

In one embodiment, the method also includes providing a first mixture of a noble metal powder and lubricant into the die cavity prior to providing the mixture of titanium powder and lubricant into the die cavity, and providing a second mixture of a noble metal powder and lubricant into the die cavity after providing the mixture of titanium powder and lubricant into the die cavity. Compressing the mixture of the titanium powder and the lubricant in the die cavity occurs together with compressing the first and second mixtures of the noble metal and lubricant to form the green sheet, and the step of sintering the green sheet forms the porous titanium sheet having a noble metal coating on both major surfaces of the porous titanium sheet.

Figure 6:
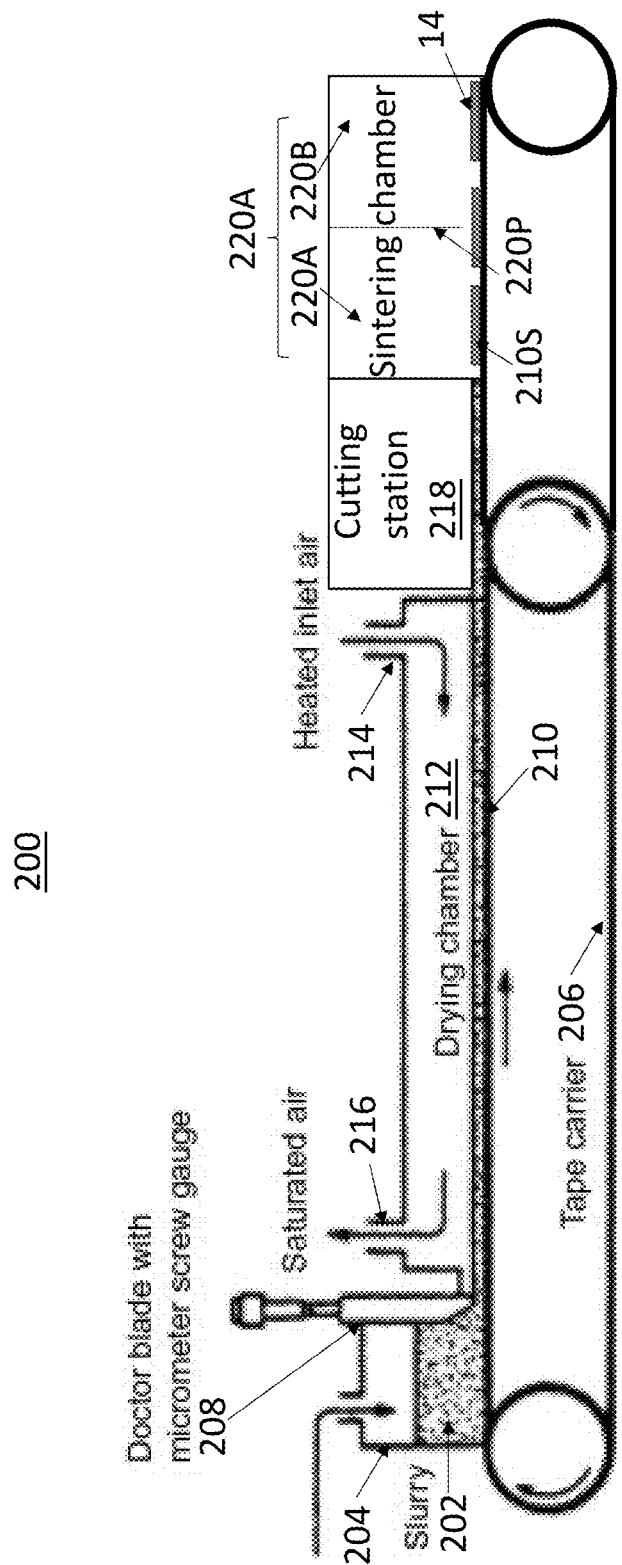
FIG. 6 is side cross sectional view of a tape casting apparatus which may be used to form a gas diffusion layer according to embodiments of the present disclosure.

In another embodiment, the porous titanium layer (e.g., sheet) that is used as an anode side gas diffusion layer 14 is formed by the tape casting process. FIG. 6 illustrates an exemplary tape casting apparatus 200 that may be used to form the anode side gas diffusion layer 14. The low-cost and scalable tape casting process can continuously produce large-format titanium containing tape used to form the anode side gas diffusion layers 14.

In an embodiment tape casting process shown in FIG. 6, a slip material 202, such as a mixture (e.g., slurry) of a titanium powder, a solvent, a binder and optionally one or more additional ingredients, such as a plasticizer and/or surfactant, is provided from a storage vessel, such as a fluid holding tank into a dispensing chamber 204. The titanium powder may comprise elemental (i.e., metal) titanium powder and/or titanium hydride (e.g., $TiH_2$) powder. Titanium hydride powder may be used to lower the production cost by a lower raw material cost and less energy usage during sintering due to its exothermic reaction when undergoing Ti conversion around 600 to 800 degrees C. Thus, in one embodiment, the titanium containing powder comprises a mixture of elemental titanium and titanium hydride powders, and the titanium hydride is subsequently thermally converted to elemental titanium in an exothermic reaction, such as during sintering and/or during a separate annealing step.

In one embodiment, titanium and titanium hydride powders with a desired particle size and distribution are blended together, and mixed with a polymeric binder, organic solvent and organic plasticizer which can be removed during a low oxygen or oxygen-free sintering process to form pores in the tape cast anode side gas diffusion layer 14. The binder, solvent and plasticizer may comprise polypropylene carbonate ("PPC"), methyl ethyl ketone ("MEK"), and polycarbonate ("PC"), respectively. Other suitable materials may also be used.

The slip material 202 is dispensed from the dispensing chamber 204 onto a moving tape carrier web 206. The tape carrier web 206 may comprise a metal (e.g., steel), glass, polymer, etc., belt that moves past a doctor blade 208. The slip material 202 moving on the tape carrier web 206 under the doctor blade 208 is flattened into a green titanium containing tape 210 by the doctor blade 208. Green titanium containing tapes 210 of various blends of powder sizes, specific content and solid ratios can be produced with slight variations of the slip material (i.e., slurry) 202 formulations.

The tape carrier web 206 may then move the green titanium containing tape 210 through a drying chamber 212. The drying chamber 212 may include a heated air inlet 214 and a saturated air outlet 216. The heated air (or another source of heat) dries the green titanium containing tape 210, and the solvent which is evaporated from the tape 210 is removed with the air through the saturated air outlet 216. The dried green titanium containing tape 210 may then by cut into titanium green sheets 210S having the shape of the anode side gas diffusion layer in a cutting station 218.

The dried green titanium containing tape 210 that has been cut into the titanium green sheets 210S is subsequently sintered in the sintering chamber 220 at a desired temperature to form the anode side gas diffusion layers 14. Preferably, the titanium green sheets 210S are sintered in an oxygen-free or a low oxygen atmosphere at 1000 to 1100 degrees C. The atmosphere may comprise an inert atmosphere of any suitable inert gas, such as a noble gas, such as argon. The atmosphere may comprise an oxygen partial pressure of less than 0.1 atm, such as 0.0001 to 0.01 atm.

In one embodiment, the dried green titanium containing tape 210 may be provided from the drying chamber 212 into the cutting station 218 and the cut tape (i.e., titanium green sheets 210S) is then provided from the cutting station 218 into a sintering chamber 220 for sintering using the same tape carrier web 206. Optionally, additional chambers, such as a de-bindering chamber, may be located between the drying chamber 212 and the sintering chamber 220 if a de-bindering step which is carried out at a temperature between the drying and sintering temperatures is desired.

In one embodiment, the sintering chamber 220 may comprise a resistively or gas heated continuous furnace (e.g., belt furnace). In this embodiment, the dried green titanium containing tape 210 (i.e., the titanium green sheet 210S) moves through the drying chamber 212, the cutting station 218 and the continuous furnace on the same tape carrier web 206. In another embodiment, the sintering chamber 220 may comprise a rapid thermal annealing ("RTA") apparatus (also referred to as a rapid thermal processing ("RTP") apparatus) in which the cut dried green titanium containing tape 210 (i.e., the titanium green sheet 210S) is heated by a flash lamp or a laser beam. In this embodiment, the green titanium containing tape 210 moves through the drying chamber 212, the cutting station 218 and the RTA apparatus on the same tape carrier web 206. Thus, the steps of flattening the slip material 202, drying the tape, cutting the tape and sintering the cut tape may occur continuously on the same moving tape carrier web 206.

In one embodiment, the sintering chamber 220 may comprise an upstream portion 220A and a downstream portion 220B which is located downstream of the upstream portion 220A with respect to the moving direction of the tape carrier web 206. An optional partition 220P may be provided between the upstream and the downstream portions of the sintering chamber 220. The upstream portion 220A may be maintained in an oxygen free or low oxygen atmosphere, such as a noble gas (e.g., argon) atmosphere. The downstream portion 220B may be maintained in a nitrogen containing atmosphere, such as a nitrogen gas or ammonia containing atmosphere (e.g., a low pressure or vacuum atmosphere with a nitrogen containing gas partial pressure). The titanium green sheet 210S may be reactively sintered in the downstream portion 220B to form a titanium nitride layer on its surface. Therefore, the titanium gas diffusion layer 14 may have a titanium nitride coating on one or both major surfaces 14A, 14B. The titanium nitride forms a hard, corrosion resistant and electrically conductive coating on the titanium gas diffusion layer 14. This coating improves the performance of the titanium gas diffusion layer 14. Furthermore, the noble metal (e.g., Au or Pt) corrosion resistant coating may be omitted if the titanium nitride corrosion resistant coating is formed. It should be noted that the titanium gas diffusion layer 14 formed by methods other than tape casting, such as powder metallurgy, may also be reactively sintered to form a titanium nitride coating thereon.

In alternative embodiments, the slip material 202 may be provided onto the tape carrier web 206 from the side and/or from the bottom instead of from the top as shown in FIG. 6. If the slip material 202 is provided from the side, then the apparatus 200 may be referred to as a slot-die coater apparatus. If the slip material 202 is provided form the bottom, then the apparatus 200 may be referred to as a lip coater or a micro-gravure coater.

In summary, the tape casting method may comprise mixing a titanium containing powder with binder, solvent and plasticizer to form a slip material 202, dispensing the slip material 202 onto the tape carrier web 206, flattening the slip material 202 moving on the tape carrier web 206 into a green titanium containing tape 210 using a doctor blade 208, drying the green titanium containing tape 210 in the drying chamber 212, cutting the greed titanium containing tape 210 into a first titanium green sheet 210S having a first porosity in the cutting station 218, and sintering the first green sheet 210S to form the porous titanium sheet 14.

In one embodiment, a sacrificial pore former material powder may be added to the slip material (i.e., slurry) 202, to allow higher sintering temperatures, thus leading to anode side gas diffusion layers 14 with higher flexural strength and toughness. Such pore former material may comprise engineered carbon powder, or spherical micron and/or submicron sized poly (methyl methacrylate) ("PMMA") powder. The pore former material is removed during the sintering step to form pores in the gas diffusion layer 14.

In one embodiment, the porous titanium sheet gas diffusion layer 14 of FIG. 3 which has a higher porosity in one portion 14A than in another portion 14B may be formed by tape casting. Such porous titanium sheet may be formed by forming two separate green titanium sheets 210S having different porosities. The different porosities may be obtained by using different titanium powder size, different solids ratios, different content of the tape material and/or pore former materials having a different volume, composition and/or size in the slip material 202. The two green titanium sheets 210S having different porosities are then placed in contact with each other and then sintered. The sintering forms the porous titanium sheet gas diffusion layer 14 of FIG. 3 with a functional grading of pore sizes and microstructure. Thus, in this embodiment, the tape casting method also includes placing a second titanium green sheet 210S having a second porosity different from the first porosity on the first titanium green sheet 210S prior to the sintering. The first and the second titanium green sheets 210S are sintered in contact with each other such that a first major side 14A of the resulting sintered porous titanium sheet 14 has a higher porosity than an opposite second major side 14B of the porous titanium sheet 14B.

In another embodiment, the conductive vias 22 shown in FIG. 5 may be formed the tape cast gas diffusion layer 14. The conductive vias 22 may be formed by forming a noble metal or conductive titanium compound vias into the green and/or sintered titanium containing tape 210. Alternatively or in addition, larger titanium or titanium hydride particles and/or wires may be added to the slip material 202. The larger particles may have an average diameter that is within 20%, such as within 10% of the thickness of the porous titanium sheet 14. The wires (e.g., fibers) may have an average length that is within 20%, such as within 10% of the thickness of the porous titanium sheet 14. The larger particles and/or wires are mixed with titanium or titanium hydride powder particles which have an average diameter that is less than 50% of the thickness of the porous titanium sheet 14. The larger particles and/or wires extend through the entire thickness of the porous titanium sheet 14 and function as the conductive vias 22. As used herein, the thickness of the porous titanium sheet 14 is the dimension between the first major side 14A and the second major side 14A of the porous titanium sheet 14.

In another embodiment, the green titanium containing tape 210 may have its surface embossed (e.g., roughened or patterned) to create raised and lowered surface portions. The patterns may comprise dimples that are recessed into the tape surface and/or a "waffle" shaped grid which protrudes from or is recessed into the tape surface. The embossing of the tape may increase its surface area and improve water flow. The embossing (e.g., surface roughening or patterning) may be performed by pressing a textured or patterned roller into the surface of the green titanium containing tape 210 prior to sintering, such as before or after drying the tape.

In another embodiment, a noble metal coating (e.g., gold or platinum group metal coating) or another corrosion inhibitor material coating may be formed on the porous titanium sheet 14 during the tape casting. In this embodiment, a powder of the corrosion inhibitor material may be formed on the surface of the dried green titanium containing tape 210 prior to sintering, to sinter the corrosion inhibitor coating onto at least one surface of the porous titanium sheet 14.

In another embodiment, ions of a material other than titanium may be implanted into the porous titanium sheet 14 or into the dried green titanium containing tape 210. For example, silicon atoms may be ion implanted into the to form the titanium silicide pore former regions described above.

Although the foregoing refers to particular preferred embodiments, it will be understood that the invention is not so limited. It will occur to those of ordinary skill in the art that various modifications may be made to the disclosed embodiments and that such modifications are intended to be within the scope of the invention. All of the publications, patent applications and patents cited herein are incorporated herein by reference in their entirety.

The invention claimed is:

1. A porous titanium sheet configured to function as an anode side gas diffusion layer of a proton exchange membrane (PEM) electrolyzer, wherein the porous titanium sheet is formed by a powder technique,
    wherein a first major side of the porous titanium sheet includes a groove and an opposite second major side of the porous titanium sheet has a substantially planar surface which lacks a groove,
    wherein the first major side of the porous titanium sheet has a higher porosity than the opposite second major side of the porous titanium sheet,
    wherein a continuous porosity gradient is formed between the first major side of the porous titanium sheet and the opposite second major side of the porous titanium sheet,
    wherein the porous titanium sheet comprises conductive vias extending through the porous titanium sheet in a thickness direction of the porous titanium sheet, the conductive vias comprising particles of titanium hydride, and
    wherein the porous titanium sheet includes a bimodal pore size distribution.

2. The porous titanium sheet of claim 1, wherein the first major side of the porous titanium sheet is configured to face an anode side flow plate, and the second major side of the porous titanium sheet is configured to face an anode electrode.

3. The porous titanium sheet of claim 1, wherein the first major side of the porous titanium sheet has a porosity which is at least 10 percent higher than a porosity of the opposite second major side of the porous titanium sheet.

4. The porous titanium sheet of claim 1, wherein:
    the porous titanium sheet contains a titanium nitride coating on at least one surface thereof; and
    the porous titanium sheet comprises pure titanium or an alloy of titanium containing more than 50 atomic percent titanium and less than 50 atomic percent of at least one of molybdenum, vanadium, niobium, tantalum, or zirconium.

5. The porous titanium sheet of claim 1, wherein the bimodal pore size distribution comprises micropores having an average pore size in a range of 1 to 5 microns and macropores having an average pore size in a range of 30 to 40 microns.

6. The porous titanium sheet of claim 1, wherein the conductive vias further comprise a noble metal, wherein the noble metal comprises ruthenium, rhodium, palladium, silver, osmium, iridium, platinum, or gold.

7. The porous titanium sheet of claim 1, wherein the particles of titanium hydride have an average diameter within 20% of the thickness of the porous titanium sheet.

8. The porous titanium sheet of claim 1, wherein the conductive vias include wires.

9. The porous titanium sheet of claim 8, wherein the wires have an average length within 20% of the thickness of the porous titanium sheet.

10. A PEM electrolyzer, comprising:
an anode side flow plate;
a cathode side flow plate;
a PEM polymer electrolyte located between the anode side flow plate and the cathode side flow plate;
an anode side gas diffusion layer comprising the porous titanium sheet of claim 1 located between the electrolyte and the anode side flow plate;
an anode electrode located between the anode side gas diffusion layer and the electrolyte;
a cathode side gas diffusion layer located between the electrolyte and the cathode side flow plate; and
a cathode electrode located between the cathode side gas diffusion layer and the electrolyte, wherein:
the first major side of the porous titanium sheet has a higher porosity than an opposite second major side of the porous titanium sheet, and
a continuous porosity gradient is formed between the first major side of the porous titanium sheet and the opposite second major side of the porous titanium sheet.

11. The PEM electrolyzer of claim 10, wherein:
the first major side of the porous titanium sheet faces the anode side flow plate, and the second major side of the porous titanium sheet faces the anode electrode; or
the first major side of the porous titanium sheet has the porosity which is at least 10 percent higher than the opposite second major side of the porous titanium sheet; or
a first major surface of the anode side flow plate which faces the anode side gas diffusion layer contains a water flow channel groove, the first major side of the porous titanium sheet which faces the first major surface of the anode side flow plate includes a groove which is a substantial mirror image of the water flow channel groove, and the opposite second major side of the porous titanium sheet has a substantially planar surface which lacks a groove.

12. A method, comprising making the porous titanium sheet of claim 1 configured to function as an anode side gas diffusion layer of a proton exchange membrane (PEM) electrolyzer by a powder technique.

13. The method of claim 12, wherein the powder technique comprises tape casting.

14. The method of claim 13, wherein the tape casting comprises:
mixing a titanium containing powder with a binder, solvent and plasticizer to form a slip material;
dispensing the slip material onto tape carrier web;
flattening the slip material moving on the tape carrier web into a green titanium containing tape using a doctor blade;
drying the green titanium containing tape;
cutting the green titanium containing tape into a first titanium green sheet having a first porosity; and
sintering the first titanium green sheet to form the porous titanium sheet.

15. The method of claim 14, wherein:
the titanium containing powder comprises a mixture of elemental titanium and titanium hydride powders; and
the titanium hydride powder is thermally converted to elemental titanium in an exothermic reaction.

16. The method of claim 14, further comprising adding a pore former material to the slip material and removing the pore former material during the sintering to form pores in the porous titanium sheet.

17. The method of claim 14, wherein the steps of flattening, drying, cutting and sintering occur continuously on a same moving tape carrier web.

18. The method of claim 14, further comprising placing a second titanium green sheet having a second porosity different from the first porosity of the first titanium green sheet prior to the sintering.

19. The method of claim 18, wherein:
the first and the second titanium green sheets are sintered in contact with each other such that a first major side of the porous titanium sheet has a higher porosity than an opposite second major side of the porous titanium sheet; and
the first major side of the porous titanium sheet is configured to face an anode side flow plate, and the second major side of the porous titanium sheet is configured to face an anode electrode.

20. The method of claim 14, wherein:
the titanium containing powder comprises particles having an average diameter less than 50% of a thickness of the porous titanium sheet;
the titanium containing powder is further mixed with at least one of additional titanium containing particles having an average diameter that is within 20% of the thickness of the porous titanium sheet or titanium containing wires having an average length that is within 20% of the thickness of the porous titanium sheet;
and the at least one of the additional titanium containing particles or the titanium containing wires extend through an entire thickness of the porous titanium sheet and function as the conductive vias.

21. The method of claim 12, further comprising reactively sintering the porous titanium sheet in a nitrogen containing atmosphere to form a titanium nitride coating on at least one surface of the porous titanium sheet.

22. The method of claim 12, further comprising placing the porous titanium sheet into the PEM electrolyzer.

* * * * *